March 13, 1956 F. F. MAUTONE 2,738,481

TERMINAL CONNECTION

Filed June 20, 1952 2 Sheets-Sheet 1

INVENTOR.

Francesco F. Mautone

BY

J. W. Douglas

His Atty.

March 13, 1956 F. F. MAUTONE 2,738,481

TERMINAL CONNECTION

Filed June 20, 1952 2 Sheets-Sheet 2

INVENTOR.

Francesco F. Mautone

BY

J. D. Douglas

His Atty.

United States Patent Office 2,738,481

Patented Mar. 13, 1956

2,738,481

TERMINAL CONNECTION

Francesco F. Mautone, Chicago, Ill., assignor to Admiral Corporation, Chicago, Ill., a corporation of Delaware Application June 20, 1952, Serial No. 294,625

1 Claim. (Cl. 339—193)

This invention relates to electrical terminal connection, and in particular to apparatus for forming a terminal connection in an electronic circuit.

A very large proportion of the cost of electronic apparatus, such as radio and television equipment, is due to the labor involved which, in turn, is largely on account of the time consumed in making electrical connections between lead wires and lugs on the base of tube supports. In execution of this step in manufacture of units of the electronic apparatus, common practice includes a repetition of first winding or twisting and then pinching with a pair of pliers the end of a wire about one of the lugs to provide a temporary connection. Usually, the total number of connections in an electronic unit are thus made. Then solder is applied to all of them in one-by-one order.

Temporary connections so made, before the solder is applied, are subject to breakage and this danger is aggravated when two or more wires are concurrently attached to the same lug.

While terminal lugs, on the base of tube supports or coil units, are frequently provided with holes only large enough to admit wires of small guage for connection with the lugs to resist displacement of the wires from said lugs, the matter of threading the wires through these holes also involved time, especially where a multipliciy of such connections are called for.

Once a temporary connection between a wire and lug is made, an unnecessary amount of time may also be consumed in inducing solder to flow effectively over the wire and lug without using an unnecessary amount of solder.

The present invention introduces conveniences into the process of wiring a unit of electronic equipment so that the steps of producing the connections may be executed with less dexterity on the part of an operator. The conveniences are inherent to both wire leads and lugs when introduced into the hands of an operator so that the actual operation of effecting a temporary coupled relationship between wire and lug may be carried out in a fraction of the time previously necessary. Once a temporary connection has been made, the construction of the lug makes it easier to apply the solder and create a permanent connection between the parts.

The invention further contemplates use of an improved tool to temporarily and quickly attach the wires to the lugs.

For a further and better understanding of the invention, reference may be had to the accompanying drawings in which.

Figure 1:
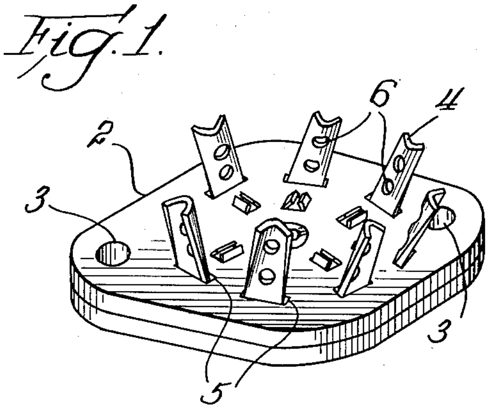
Fig. 1 is a view, in perspective, of the bottom of a vacuum tube socket illustrating an embodiment of the invention.
Figure 2:
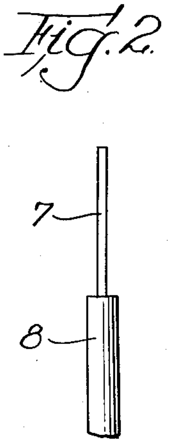
Fig. 2 is a view of an end portion of a wire before the end portion of the wire has been deformed for use with the invention.
Figure 3:
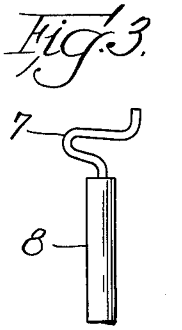
Fig. 3 is a view of the wire shown in Fig. 2, after it has been deformed in accordance with the invention.

Fig. 1 shows the lower side of a support for a vacuum tube. No attempt will be made to completely indicate its structure since the invention may be applied to a wide variety of such supports. The support includes a base 2 of some suitable dielectric material. It may be constructed of laminated plates as shown or may be entirely molded of plastic. Holes 3 extend through the base for its connection by bolts or rivets to a metal frame. A vacuum tube may be plugged into the base on the side opposite to the one shown and electrical connection may be established with elements of the tube by means of a series of lugs 4 each of which connects to a socket, not shown, in which one of the several prongs, commonly found on the base of a vacuum tube, may be received. The conductors 4 may pass through a series of apertures 5 disposed in a circle about a point centrally of the base. They extend out from the base and provide lugs of length suitable for a soldered connection with one or more wires. Holes 6 are provided through each of the lugs 4 arranged to receive the base end portion 7 of an insulated wire 8.

Figure 4:
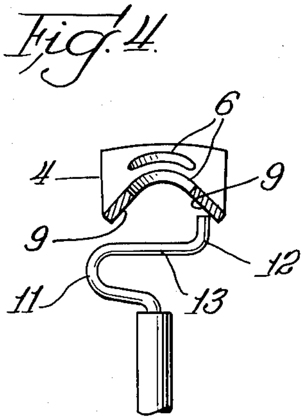
Fig. 4 is a view of the wire of Fig. 3, in association with a solder lug preliminary to attachment therewith.

A preliminary step in connecting the wire with one of the lugs 4, as commonly practiced, is to first thread the portion of wire 7 through one of the holes 6 and then bend the free end at least part or all the way around the lug before any other operation is performed on the wire and lug. To facilitate the threading operation, a novel feature is imparted to the lug 4. Said lug is deformed to provide at least one cam surface 9 beside one or both of the holes 6 so that if a hurried attempt is made to thread the wire through the lug, and in the operation the extremity of portion 7 first engages a region of the lug beside the hole instead of first passing therethrough, the cam 9 diverts the wire into said hole. It is therefore necessary that the cams 9 take the form of surfaces slanting toward the holes 6. The nature of their slant may be straight or curved, or both curved and straight as in Fig. 4 wherein a region at the holes 6 is arcuate but continuous to substantially straight portions laterally of the central region. Additionally, the cams 9 may extend longitudinally or transversely of the lugs and may even be conical about the holes 6 since it is in keeping with the invention to provide means for diverting a wire into one of the holes 6 if a person making the assembly aforesaid inadvertently fails to pass the tip 7 through the hole 6 before the wire engages the lug.

An additional aid is provided for facilitating temporary connection of the wire 8 with one of the lugs 4 by imparting a new formation to the end portion 7. This may be produced preferably by dies. This operation can advisably be performed by the same machine which also strips the insulation from the wire to provide the bared end portion 7.

In detail, the novel formation imparted to the end portion 7 includes an intermediate portion 11 offset from the unformed part of the wire. The portion 11 is joined to an end portion 12 by a transverse section 13, the end portion being offset from the body of the wire and in diametrically opposite relationship to the offset portion 11.

Figures 5, 6:
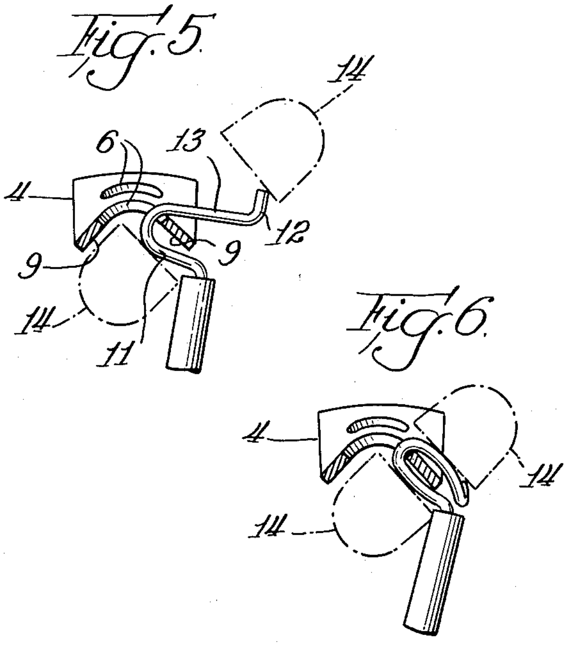
Fig. 5 is a similar view in an advanced stage.
Fig. 6 is another view of the parts at the time of completion of a temporary connection between the wire and lug.
Figure 7:
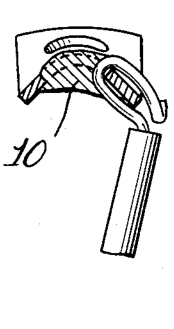
Fig. 7 is a view corresponding to Fig. 6 after the parts have been soldered.
Figure 8:
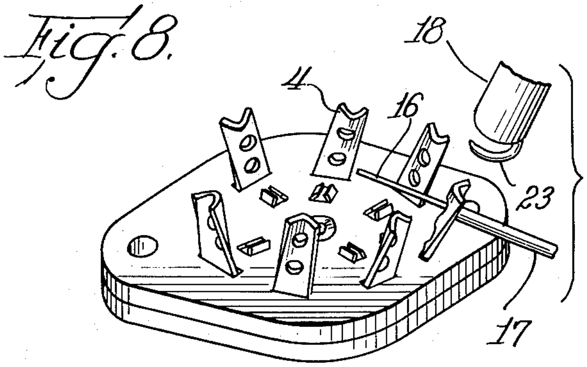
Fig. 8 is a view of the socket shown in Fig. 1 with lead wire and a different means, in perspective, for temporarily connecting said wire to said lug.

As previously indicated, the cam surfaces 9 may guide the end offset 12 into the hole 6 whereupon the wire is moved laterally until the intermediate offset 11 extends through the hole (Fig. 5). Then the offsets are grasped by the jaws of a pair of pliers 14 and forced toward each other until a portion of the lug, beside the hole 6, is embraced by the end portion 7. This operation provides temporary association of the wire 8 with the lug 4. The plier jaws should exert pressure on diagonally opposite portions of the offsets 11 and 12 as indicated to provide the best operation.

Once the wire is temporarily coupled to the lug, as indicated, solder 10 is applied to both wire and lug.

This method of making a soldered connection has the following advantages over the method of making a connection as previously practiced: The operation performed by the pliers is simplified since no twisting of the same is called for. More wires can be thus connected to the same lug. Owing to surface tension of liquids, fused solder is drawn toward the intersection of the cam surfaces adjacent the holes 6 instead of collecting more evenly over the lugs. This is a desirable feature since a neater soldered joint is the result and there is economy in consumption of solder. Finally, a joint so made is more reliable since it is less susceptible to fracture than joints produced in accordance with previous practice.

Figure 9:
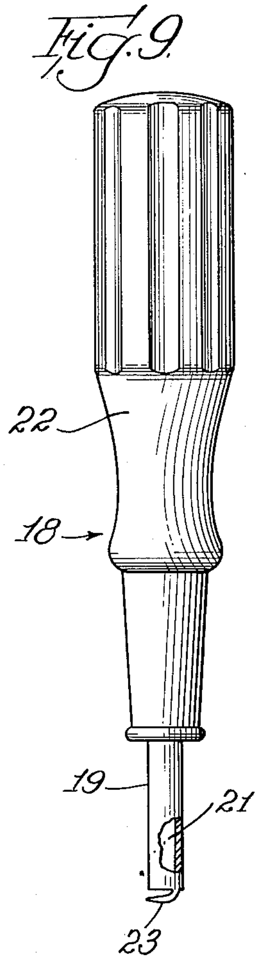
Fig. 9 is a side elevational view of a special tool used for attaching wires to the lugs.
Figure 11:
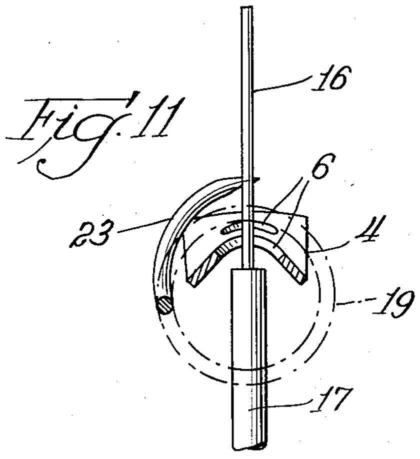
Fig. 11 is a view of one of the lugs, in transverse section, showing a lead wire in an early stage of assembly with said lug.
Figure 10:
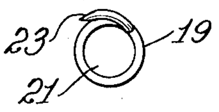
Fig. 10 is a bottom plan view thereof.
Figure 12:
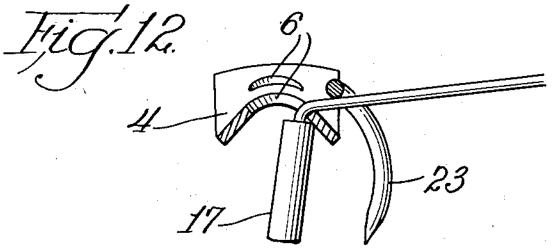
Fig. 12 is a view corresponding to Fig. 11 at the later stage of assembly.
Figure 14:
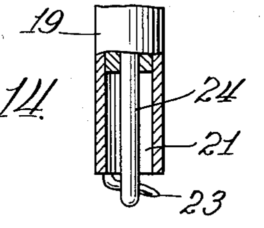
Fig. 14 is a fragmentary view of a different style of tool, a portion of which is broken away to reveal the structure of the interior of said tool.
Figure 13:
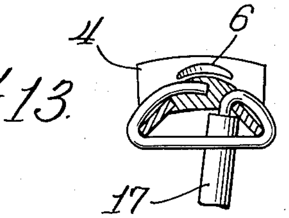
Fig. 13 is another view, showing the lug and wire in permanent connection.

In the embodiment shown in Figs. 8 to 14 the tube socket is identical to the one shown in Fig. 1. Therefore, the reference characters used in connection with Fig. 1 are also applicable to Fig. 8. The means by which a bare end 16 of an insulated wire 17, is temporarily connected with one of the lugs 4, includes a special tool indicated, in its entirety, by the reference character 18 (Fig. 9). It comprises a tubular shank portion 19 having a bore 21 extending longitudinally thereof from its lower end, said bore being of diameter adequate to accommodate therein any one of the lugs 4. The shank may be manipulated by a handle 22 thereon to slide the shank over the lug and to turn it thereabout. The lower end of shank 19 bears a hook 23 which spirals downward from said shank and terminates in a free end spaced from the shank to enable the wire portion 16 to pass between said shank and free end when the tool is rotated and to be cammed upward against the shank by the spiral. Further turning of the tool clockwise (Fig. 11) bends the portion 16 as shown in Fig. 12. Continuation of this turning operation is sufficient to wind the end 16 about the lug as it is depicted in Fig. 13. Then solder is applied to bond the wire, so twisted, to the lug 4.

While the structure of the tool 18 is satisfactory for a relatively stiff lug 4, a somewhat different tool is desirable or essential when the lugs are of a very thin gauge of metal. In connection with such a structurally weak lug, it is desirable that a pilot portion or rod 24 be included centrally of the bore 21 (Fig. 14) to support the lug while bending the wire about its lateral extremities.

Although I have described my invention in different embodiments thereof, I am aware that extensive other departures may be made therefrom without departing from the spirit or scope of the idea.

I claim:

A support for a vacuum tube having thereon a plurality of prongs comprising a dielectric base having a socket thereon for each of the prongs and means on the base by which electrical communication with the respective prongs may be established when said prongs are in the sockets comprising a conductive strip communicating with each of the sockets and terminating in a free end spaced from and below the base, at least one of the strips being of V-shaped cross-section at its free end and being increasingly less acute in V-shape toward the base and having an aperture in at least one point on the apex of the V-shaped formation.

References Cited in the file of this patent

UNITED STATES PATENTS

| | | |
|---|---|---|
| 1,198,500 | Wilcox | Sept. 19, 1916 |
| 1,611,014 | Frantz | Dec. 14, 1926 |
| 1,749,476 | Fillmore | Mar. 4, 1930 |
| 2,246,931 | Chiffey | June 24, 1941 |
| 2,300,309 | Peters | Oct. 27, 1942 |
| 2,300,350 | Del Camp | Oct. 27, 1942 |
| 2,330,013 | Schultz | Sept. 21, 1943 |
| 2,486,115 | Chiuchiolo | Oct. 25, 1949 |
| 2,640,185 | Alden | May 26, 1953 |
| 2,677,116 | Ritter | Apr. 27, 1954 |
| 2,705,312 | Peters | Mar. 29, 1955 |